US007200700B2

(12) United States Patent
Chen

(10) Patent No.: US 7,200,700 B2
(45) Date of Patent: Apr. 3, 2007

(54) SHARED-IRQ USER DEFINED INTERRUPT SIGNAL HANDLING METHOD AND SYSTEM

(75) Inventor: Chih-Wei Chen, Taipei (TW)

(73) Assignee: Inventec Corporation (TW)

( * ) Notice: Subject to any disclaimer, the term of this patent is extended or adjusted under 35 U.S.C. 154(b) by 133 days.

(21) Appl. No.: 11/134,571

(22) Filed: May 19, 2005

(65) Prior Publication Data
US 2006/0265537 A1    Nov. 23, 2006

(51) Int. Cl.
   G06F 13/10    (2006.01)
   G06F 13/24    (2006.01)
   G06F 9/00     (2006.01)
   G06F 9/44     (2006.01)
   G06F 15/177   (2006.01)
   G06F 11/07    (2006.01)

(52) U.S. Cl. ............... 710/266; 710/48; 710/269
(58) Field of Classification Search ........ 710/269, 710/260, 266, 262, 1, 740, 48, 264, 268, 710/313; 718/1; 703/24; 712/244; 713/2; 709/253; 711/203
See application file for complete search history.

(56) References Cited

U.S. PATENT DOCUMENTS

| | | | |
|---|---|---|---|
| 4,334,307 A * | 6/1982 | Bourgeois et al. | 714/45 |
| 4,787,030 A * | 11/1988 | Harter et al. | 711/5 |
| 5,559,965 A * | 9/1996 | Oztaskin et al. | 710/104 |
| 6,006,301 A * | 12/1999 | Tetrick | 710/260 |
| 6,438,622 B1 * | 8/2002 | Haghighi et al. | 710/1 |
| 6,467,007 B1 * | 10/2002 | Armstrong et al. | 710/260 |
| 6,842,811 B2 * | 1/2005 | Barry et al. | 710/260 |
| 7,093,989 B2 * | 8/2006 | Walmsley et al. | 400/62 |
| 2006/0026564 A1 * | 2/2006 | Cabillic | 717/118 |
| 2006/0123172 A1 * | 6/2006 | Herrell et al. | 710/269 |

OTHER PUBLICATIONS

"A dynamically reconfigured UMTS multi-channel complex code matched filter" by I.O. Kennedy (abstract only) Publication date: Dec. 11-14, 2005.*

* cited by examiner

*Primary Examiner*—Gopal C. Ray
(74) *Attorney, Agent, or Firm*—Peter F. Corless; Steven M. Jensen; Edwards Angell Palmer & Dodge LLP

(57) ABSTRACT

A shared-IRQ user-defined interrupt signal handling method and system is proposed, which is designed for use with a computer platform to allow a group of peripheral devices connected to an interrupt-configurable peripheral interface to share system interrupt lines IRQ with another group of peripheral devices connected to an interrupt nonconfigurable peripheral interface; which is characterized by the provision of an interrupt configuration table for defining a virtual device for the interrupt-configurable peripheral interface as well as each specific system interrupt line that is shared by the two groups of peripheral devices. This feature allows system interrupt lines IRQ to be shared by the two different groups of peripheral devices, and also allows the implementation to be easier to carried out than prior art without involving complex and difficult BIOS coding.

10 Claims, 2 Drawing Sheets

| | 121 |
|---|---|
| Interrupt_Type | Interrupt from APIC (00) or 8259 (03) |
| PO_and_EL | Active and Trigger Mode |
| Source_BUS_ID | Bus Number |
| SOurce_BUT_IRQ | Device Number and Device INT Line |
| Destination_IOAPIC_ID | IOAPIC ID |
| Destination_IOAPIC_INTIN | IOAPIC Line In |

FIG. 2

SHARED-IRQ USER DEFINED INTERRUPT SIGNAL HANDLING METHOD AND SYSTEM

BACKGROUND OF THE INVENTION

1. Field of the Invention

This invention relates to computer hardware technology, and more particularly, to a shared-IRQ user-defined interrupt signal handling method and system which is designed for use in conjunction with a computer platform equipped with a programmable interrupt controller, an interrupt-configurable peripheral interface, and an interrupt-nonconfigurable peripheral interface such as a PCI (Peripheral Component Interconnect) interface, for providing a user-defined interrupt signal handling function under the shared-IRQ (Interrupt ReQuest) architecture of the computer platform for the purpose of handling user-defined interrupt signals issued by peripheral devices connected to the interrupt-configurable peripheral interface.

2. Description of Related Art

Computer systems typically utilize interrupt signals for peripheral devices, such as hard disk drives, keyboards, and mouse devices, to request the CPU (Central Processing Unit) to temporarily halt its current operation and execute related interrupt handling programs to handle requests from the peripheral devices for the peripheral devices to exchange data with the CPU.

PIC (Programmable Interrupt Controller) is a PC hardware architecture developed by the Intel Corporation of USA that allows the user to define a set of interrupt signals for use by the peripheral devices connected to a computer system. In addition, IO-APIC (Input/Output Advanced Programmable Interrupt Controller) is an advanced type of PIC that is specifically designed for use on multi-processor based computer systems, such as network servers, to offer a multiplexed interrupt control function.

In practical application, in order to allow an IO-APIC chip to operate in the conventional PIC mode, it is required to connect a specified system interrupt line IRQ to a PCI (Peripheral Component Interconnect) controller. When the PCI controller receives a user-defined interrupt signal from a connected peripheral device, the PCI controller will responsively issue a corresponding PCI interrupt signal to the CPU, which causes the CPU to execute the peripheral device's driver program. On the other hand, when the IO-APIC operates in APIC mode, the required interrupt configurations should be predefined in the MP (Multi-Processor) table or ACPI (Advanced Configuration and Power Interface) table in the BIOS (Basic Input/Output System) of the computer system In actual operation, if in PIC mode a user-defined interrupt signal share the same system interrupt line IRQ with a PCI interrupt, then since BIOS will dynamically assign system interrupt lines IRQ to the PCI peripheral interface, it would undesirably cause the driver program that is requested by the user-defined interrupt signal unable to obtain a system interrupt line IRQ. For this sake, in most network server applications with multi-processor architecture, all the user-defined interrupt signals are separately used without sharing system interrupt lines IRQ with other types of peripheral devices such as PCI peripheral devices. One drawback to this practice, however, is that the BIOS will need to respond to each user-defined interrupt signal by finding out an unused and prespecified system interrupt line IRQ, and this procedure would require the system design to be involved in complex and difficult BIOS coding.

SUMMARY OF THE INVENTION

It is therefore an objective of this invention to provide a shared-IRQ user-defined interrupt signal handling method and system which allows system interrupt lines IRQ on a computer platform to be shared by a group of peripheral devices connected to an interrupt-configurable peripheral interface and another group of peripheral devices connected to an interrupt-nonconfigurable peripheral interface, and which can be implemented without involving complex and difficult BIOS coding.

The shared-IRQ user-defined interrupt signal handling method and system according to the invention is designed for use in conjunction with a computer platform equipped with a programmable interrupt controller, an interrupt-configurable peripheral interface, and an interrupt-nonconfigurable peripheral interface such as a PCI (Peripheral Component Interconnect) interface, for providing a user-defined interrupt signal handling function under the shared-IRQ (Interrupt ReQuest) architecture of the computer platform for the purpose of handling user-defined interrupt signals issued by peripheral devices connected to the interrupt-configurable peripheral interface.

In terms of method, the invention comprises: (1) building an interrupt configuration table for defining a virtual device for the interrupt-configurable peripheral interface as well as each specific system interrupt line that is shared by both the interrupt-configurable peripheral interface and the interrupt nonconfigurable peripheral interface; (2) in actual operation, listening to each user-defined interrupt signal issued by each peripheral device connected to the interrupt-configurable peripheral interface and responsively issuing an interrupt processing enable message; (3) responding to the interrupt processing enable message by consulting the interrupt configuration table to find out which peripheral device connected to the interrupt nonconfigurable peripheral interface share the same system interrupt line with the peripheral device issuing the user-defined interrupt signal, and then consulting a configuration register associated with the interrupt-nonconfigurable peripheral interface to find out the shared system interrupt line; and (4) via the system interrupt line, activating a driver program associated with the peripheral device issuing the user-defined interrupt signal to thereby allow the activated driver program to be executed via the system interrupt line to handle the request from the peripheral device issuing the user-defined interrupt signal.

In terms of system, the invention comprises: (a) an interrupt signal responding module, which is capable of listening to each user-defined interrupt signal issued by each peripheral device connected to the interrupt-configurable peripheral interface and responsively issuing an interrupt processing enable message; (b) a user-defined interrupt signal processing module, which includes an interrupt configuration table for defining a virtual device for the interrupt-configurable peripheral interface as well as each specific system interrupt line that is shared by both the interrupt-configurable peripheral interface and the interrupt-nonconfigurable peripheral interface, and which is capable of being activated by each interrupt processing enable message from the interrupt signal responding module to thereupon consult the interrupt configuration table to find out which peripheral device connected to the interrupt-nonconfigurable peripheral interface share the same system interrupt line with the peripheral device issuing the user-defined interrupt signal, and then consult a configuration register associated with the interrupt-nonconfigurable peripheral interface to find out the shared system interrupt line; and (c) a driver program activating module, which is capable of activating a driver program associated with the peripheral device issuing the user-defined interrupt signal via the system interrupt line specified by the interrupt signal processing module to thereby allow the activated driver program to be executed via the system interrupt line to handle the request from the peripheral device issuing the user-defined interrupt signal.

The shared-IRQ user-defined interrupt signal handling method and system according to the invention is characterized by the provision of an interrupt configuration table for defining a virtual device for the interrupt-configurable peripheral interface as well as each specific system interrupt line that is shared by the two groups of peripheral devices. This feature allows system interrupt lines IRQ to be shared by the peripheral devices connected to the interrupt-configurable peripheral interface and the peripheral devices connected to the interrupt-nonconfigurable peripheral interface, and also allows the implementation to be easier to carried out than prior art without involving complex and difficult BIOS coding.

BRIEF DESCRIPTION OF DRAWINGS

The invention can be more fully understood by reading the following detailed description of the preferred embodiments, with reference made to the accompanying drawings, wherein:

FIG. 2 is a table showing an example of the interrupt configuration table utilized by the shared-IRQ user-defined interrupt signal handling system according to the invention.

DETAILED DESCRIPTION OF PREFERRED EMBODIMENTS

Figure 1:
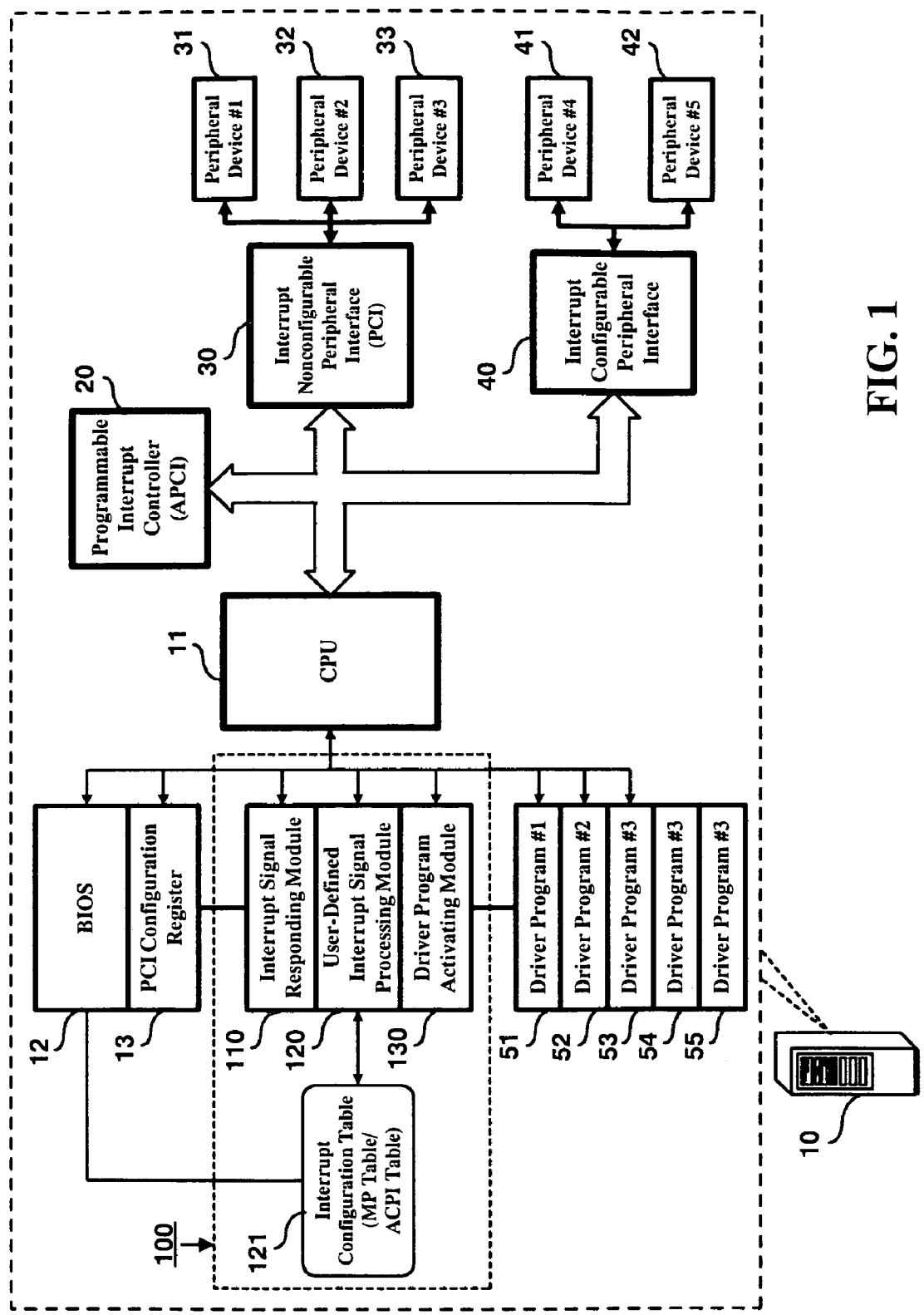
FIG. 1 is a schematic diagram showing the application architecture and modularized object-oriented component model of the shared-IRQ user-defined interrupt signal handling system according to the invention.

The shared-IRQ user-defined interrupt signal handling method and system according to the invention is disclosed in full details by way of preferred embodiments in the following with reference to the accompanying drawings.

FIG. 1 is a schematic diagram showing the application architecture and modularized object-oriented component model of the shared-IRQ user-defined interrupt signal handling system according to the invention (as the part enclosed in the dotted box indicated by the reference numeral 100). As shown, the shared-IRQ user-defined interrupt signal handling system of the invention 100 is designed for use in conjunction with a computer platform 10, particularly a multi-processor based computer platform (such as a network server), that is equipped with a programmable interrupt controller 20, such as an APIC (Advanced Programmable Interrupt Controller) chip developed by the Intel Corporation of USA, and is further equipped with an interrupt-nonconfigurable peripheral interface 30 and an interrupt-configurable peripheral interface 40, where the interrupt-nonconfigurable peripheral interface 30 is for example a PCI (Peripheral Component Interconnect) compliant interface for connections to one or more PCI peripheral devices (in the embodiment of FIG. 1, for example, only 3 peripheral devices 31, 32, 33 are connected; but in practice, the number of such peripheral devices is unrestricted), while the interrupt-configurable peripheral interface 40 is used for connections to one or more peripheral devices (in the embodiment of FIG. 1, for example, only 2 peripheral devices 41, 42 are connected; but in practice, the number of such peripheral devices is unrestricted) that can be configured to generate user-defined interrupt signals. These peripheral devices 31, 32, 33, 41, 42 can be, for example, external hard disk modules, external CD/DVD modules, keyboard, mouse, and so on. Moreover, the computer platform 10 is preloaded with a cluster of driver programs 51, 52, 53, 54, 55 respectively used to drive these peripheral devices 31, 32, 33, 41, 42.

In actual operation, the shared-IRQ user-defined interrupt signal handling system of the invention 100 is capable of providing a user-defined interrupt signal handling function that allows the user-defined interrupt signals issued by the peripheral devices 41, 42 to share the same system interrupt lines IRQ with the PCI peripheral devices 31, 32, 33 connected to the interrupt-nonconfigurable peripheral interface 30. More specifically, the shared-IRQ user-defined interrupt signal handling system of the invention 100 is capable of handling each user-defined interrupt signal issued by any one of the peripheral devices 41, 42 connected to the interrupt-configurable peripheral interface 40 for the purpose of finding out the system interrupt line IRQ that is assigned to the user-defined interrupt signal so as to allow the CPU (Central Processing Unit) 11 of the computer platform 10 to execute the corresponding driver programs 54, 55 associated with the peripheral devices 41, 42, i.e., if the peripheral device 41 issues a user-defined interrupt signal, the driver program 54 is executed via the specified system interrupt line IRQ; if the peripheral device 42 issues a user-defined interrupt signal, the driver program 55 is executed via the specified system interrupt line IRQ.

As shown in FIG. 1, the modularized object-oriented component model of the shared-IRQ user-defined interrupt signal handling system of the invention 100 comprises: (a) an interrupt signal responding module 110; (b) a user-defined interrupt signal processing module 120; and (c) a driver program activating module 130. In practical implementation, for example, the shared-IRQ user-defined interrupt signal handling system of the invention 100 can be entirely realized as computer code and integrate the computer code as an add-on module to the operating system of the computer platform 10, so as to be executed by the CPU 11 of the computer platform 10 to provide the desired shared-IRQ user-defined interrupt signal handling function.

The interrupt signal responding module 110 is capable of listening to each user-defined interrupt signal issued by any one of the peripheral devices 41, 42 connected to the interrupt-configurable peripheral interface 40 that is received by the programmable interrupt controller 20, and responsively issuing an interrupt processing enable message to the user-defined interrupt signal processing module 120.

The user-defined interrupt signal processing module 120 includes an interrupt configuration table 121 for defining a virtual device for the interrupt-configurable peripheral interface 40 as well as each specific system interrupt line IRQ that is shared by the peripheral devices 41, 42 connected to the interrupt-configurable peripheral interface 40 and the PCI peripheral devices 31, 32, 33 connected to the interrupt-nonconfigurable peripheral interface 30. In actual operation, the user-defined interrupt signal processing module 120 is capable of being activated in response to the interrupt processing enable message from the interrupt signal responding module 110 to thereupon consult the interrupt configuration table to find out which PCI peripheral device (i.e., 31, 32, or 33) connected to the interrupt-nonconfigurable peripheral interface 30 share the same system interrupt line IRQ with the peripheral device (41 or 42) issuing the user-defined interrupt signal, and then consult a PCI configuration register 13 of the interrupt-nonconfigurable peripheral interface 30 to find out the shared system interrupt line IRQ. In practical implementation, for example, the interrupt configuration table 121 is integrated to an MP (Multi-Processor) table or ACPI (Advanced Configuration and Power Interface) table in the BIOS 12 of the computer platform 10. FIG. 2 shows an example of the interrupt configuration table 121, in which the Source_BUS_ID and Source_BUS_IRQ parameters define a virtual device, while the Destination_IOAPIC_ID and Destination_IOAPIC_INTIN parameters define the interrupt signals corresponding to the programmable interrupt controller 20.

The driver program activating module 130 is capable of activating a driver program (i.e., 54 or 55) that is associated with the peripheral device (41 or 42, or 33) issuing the currently received user-defined interrupt signal by means of the system interrupt line IRQ specified by the interrupt signal processing module 120 to thereby allow the activated driver program (54 or 55) to be executed via the system interrupt line IRQ to handle the request from the peripheral device (41 or 42) issuing the user-defined interrupt signal.

In the following description of a practical application, it is assumed that the peripheral device 41 connected to the interrupt-configurable peripheral interface 40 is an external hard disk module, and which is connected by means of hot plugging to the computer platform 10 and thus causes the generation of a user-defined interrupt signal.

In the foregoing case, the user-defined interrupt signal issued by the peripheral device 41 is first transferred by the interrupt-configurable peripheral interface 40 to the programmable interrupt controller 20. This action will activate the interrupt signal responding module 110 in the user-defined interrupt signal handling system of the invention 100 to respond to the user-defined interrupt signal by issuing an interrupt processing enable message to the interrupt signal processing module 120. In response, the interrupt signal processing module 120 consults the interrupt configuration table 121 to find out which PCI peripheral device (i.e., 31, 32, or 33) connected to the interrupt-nonconfigurable peripheral interface 30 share the same system interrupt line IRQ with the peripheral device 41 issuing the user-defined interrupt signal, and then consult the associated PCI configuration register 13 of the interrupt-nonconfigurable peripheral interface 30 to find out the shared system interrupt line IRQ.

Under PIC mode of operation, the user-defined interrupt signal processing module 120 will perform the following procedural steps:

(S1) from the MP table, check which virtual device shares the same APIC_ID and APIC_INTIN with the user-defined interrupt signal;

(S2) check which BUS and Device numbers are assigned to the virtual device;

(S3) check the PCI configuration register 13 to find out which system interrupt line IRQ is assigned to the virtual device; and (S4) perform an interrupt handling procedure by way of the system interrupt line IRQ.

On the other hand, under APIC or ACPI mode of operation, the user-defined interrupt signal processing module 120 will perform the following procedural steps:

(S1) from the MP table, check the IRQ configuration on each IO-APIC;

(S2) from the MP table, check the APIC_ID and APCI_INTIN settings for the virtual device;

(S3) assign a system interrupt line IRQ to the virtual device;

(S4) check the operating status of APIC;

(S5) determine which system interrupt line IRQ is usable under the current APIC operating status; and (S6) perform an interrupt handling procedure by way of the system interrupt line IRQ.

The system interrupt line IRQ specified by the user-defined interrupt signal processing module 120 is then utilized by the driver program activating module 130 to activate the corresponding driver program 54 associated with the peripheral device 41 issuing the user-defined interrupt signal. This allows the CPU 11 to execute the driver program 54 to handle the request from the peripheral device 41 issuing the user-defined interrupt signal.

In conclusion, the invention provides a shared-IRQ user-defined interrupt signal handling method and system for use with a computer platform to allow a group of peripheral devices connected to an interrupt-configurable peripheral interface to share system interrupt lines IRQ with another group of peripheral devices connected to an interrupt nonconfigurable peripheral interface, and which is characterized by the provision of an interrupt configuration table for defining a virtual device for the interrupt-configurable peripheral interface as well as each specific system interrupt line that is shared by the two groups of peripheral devices. This feature allows system interrupt lines IRQ to be shared by the peripheral devices connected to the interrupt-configurable peripheral interface and the peripheral devices connected to the interrupt-nonconfigurable peripheral interface, and also allows the implementation to be easier to carried out than prior art without involving complex and difficult BIOS coding. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A shared-IRQ user-defined interrupt signal handling method for use on a computer platform equipped with a programmable interrupt controller, an interrupt-configurable peripheral interface, and an interrupt-nonconfigurable peripheral interface, where the interrupt-configurable peripheral interface and the interrupt-nonconfigurable peripheral interface share a set of system interrupt lines of the computer platform, for providing a user-defined interrupt signal handling function for handing each user-defined interrupt signal issued by a peripheral device connected to the interrupt-configurable peripheral interface;

the shared-IRQ user-defined interrupt signal handling method comprising:

building an interrupt configuration table for defining a virtual device for the interrupt-configurable peripheral interface as well as each specific system interrupt line that is shared by both the interrupt-configurable peripheral interface and the interrupt nonconfigurable peripheral interface;

in actual operation, listening to each user-defined interrupt signal issued by each peripheral device connected to the interrupt-configurable peripheral interface and responsively issuing an interrupt processing enable message;

responding to the interrupt processing enable message by consulting the interrupt configuration table to find out which peripheral device connected to the interrupt nonconfigurable peripheral interface share the same system interrupt line with the peripheral device issuing the user-defined interrupt signal, and then consulting a configuration register associated with the interrupt-nonconfigurable peripheral interface to find out the shared system interrupt line; and via the system interrupt line, activating a driver program associated with the peripheral device issuing the user-defined interrupt signal to thereby allow the activated driver program to be executed via the system interrupt line to handle the request from the peripheral device issuing the user-defined interrupt signal.

2. The shared-IRQ user-defined interrupt signal handling method of claim 1, wherein the programmable interrupt controller is an APIC (Advanced Programmable Interrupt Controller) chip.

3. The shared-IRQ user-defined interrupt signal handling method of claim 1, wherein the interrupt configuration table is integrated to a Multi-Processor (MP) table in the BIOS (Basic Input/Output System) of the computer platform.

4. The shared-IRQ user-defined interrupt signal handling method of claim 1, wherein the interrupt configuration table is integrated to an ACPI (Advanced Configuration and power Interface) table in the BIOS (Basic Input/Output System) of the computer platform.

5. The shared-IRQ user-defined interrupt signal handling method of claim 1, wherein the interrupt-nonconfigurable peripheral interface is a PCI (Peripheral Component Interconnect) compliant peripheral interface.

6. A shared-IRQ user-defined interrupt signal handling system for use with a computer platform equipped with a programmable interrupt controller, an interrupt-configurable peripheral interface, and an interrupt-nonconfigurable peripheral interface, where the interrupt-configurable peripheral interface and the interrupt-nonconfigurable peripheral interface share at least one system interrupt line of the computer platform, for providing a user-defined interrupt signal handling function for handing each user-defined interrupt signal issued by a peripheral device connected to the interrupt-configurable peripheral interface;

the shared-IRQ user-defined interrupt signal handling system comprising:

an interrupt signal responding module, which is capable of listening to each user-defined interrupt signal issued by each peripheral device connected to the interrupt-configurable peripheral interface and responsively issuing an interrupt processing enable message;

a user-defined interrupt signal processing module, which includes an interrupt configuration table for defining a virtual device for the interrupt-configurable peripheral interface as well as each specific system interrupt line that is shared by both the interrupt-configurable peripheral interface and the interrupt-nonconfigurable peripheral interface, and which is capable of being activated by each interrupt processing enable message from the interrupt signal responding module to thereupon consult the interrupt configuration table to find out which peripheral device connected to the interrupt-nonconfigurable peripheral interface share the same system interrupt line with the peripheral device issuing the user-defined interrupt signal, and then consult a configuration register associated with the interrupt-nonconfigurable peripheral interface to find out the shared system interrupt line; and a driver program activating module, which is capable of activating a driver program associated with the peripheral device issuing the user-defined interrupt signal via the system interrupt line specified by the interrupt signal processing module to thereby allow the activated driver program to be executed via the system interrupt line to handle the request from the peripheral device issuing the user-defined interrupt signal.

7. The shared-IRQ user-defined interrupt signal handling system of claim 6, wherein the programmable interrupt controller is an APIC (Advanced Programmable Interrupt Controller) chip.

8. The shared-IRQ user-defined interrupt signal handling system of claim 6, wherein the interrupt configuration table is integrated to a Multi-Processor (MP) table in the BIOS (Basic Input/Output System) of the computer platform.

9. The shared-IRQ user-defined interrupt signal handling system of claim 6, wherein the interrupt configuration table is integrated to an ACPI (Advanced Configuration and power Interface) table in the BIOS (Basic Input/Output System) of the computer platform.

10. The shared-IRQ user-defined interrupt signal handling system of claim 6, wherein the interrupt-nonconfigurable peripheral interface is a PCI (Peripheral Component Interconnect) compliant peripheral interface.

* * * * *